Figure 1:
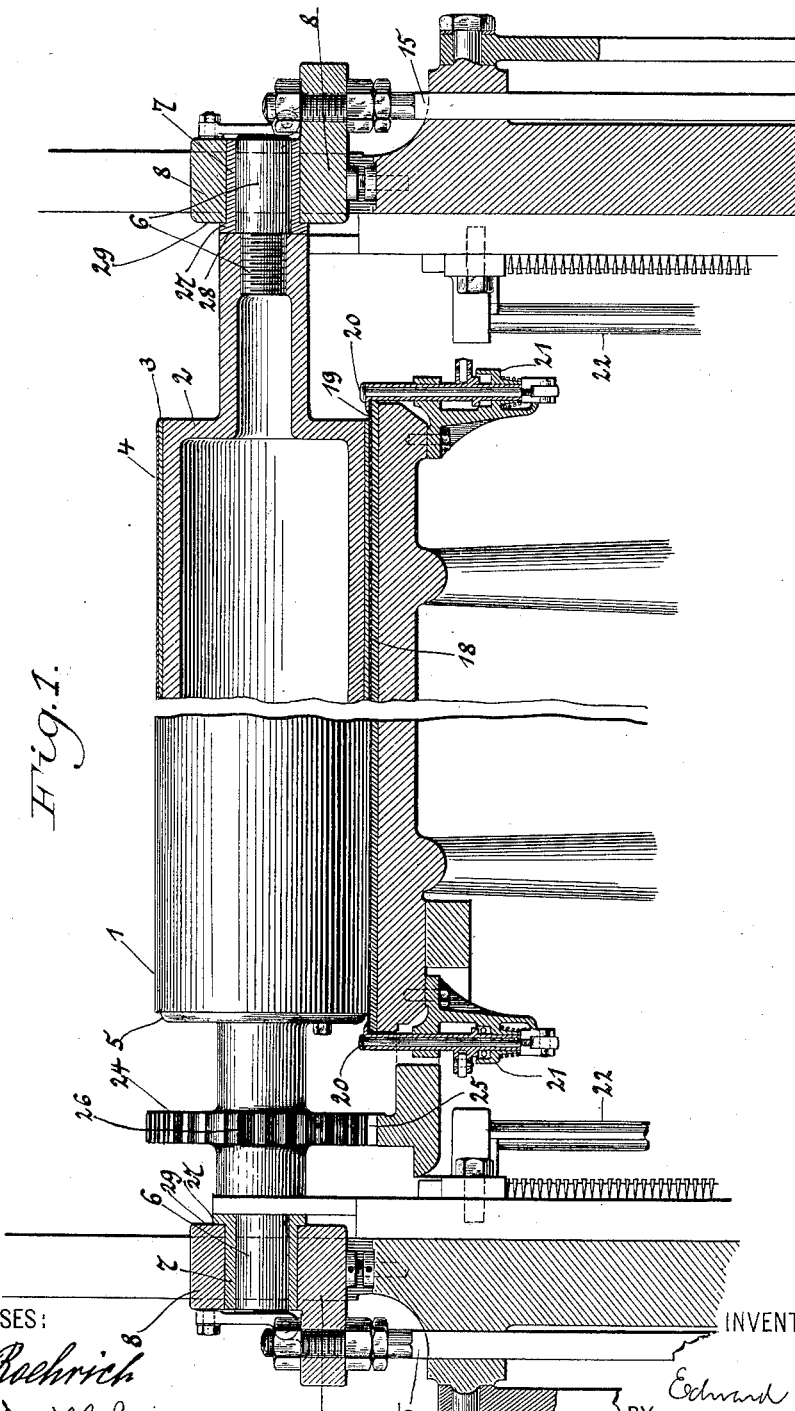

No. 662,870.  
E. HETT.  
PRESS.  
(Application filed Nov. 20, 1899.)  
Patented Nov. 27, 1900.

(No Model.)  
2 Sheets—Sheet 1.

WITNESSES:  
F. N. Roehrich  
Geo W. Reilly Jr.

INVENTOR  
Edward Hett  
BY  
Kenyon & Kenyon  
ATTORNEYS

No. 662,870. Patented Nov. 27, 1900.
E. HETT.
PRESS.
(Application filed Nov. 20, 1899.)
(No Model.) 2 Sheets—Sheet 2.
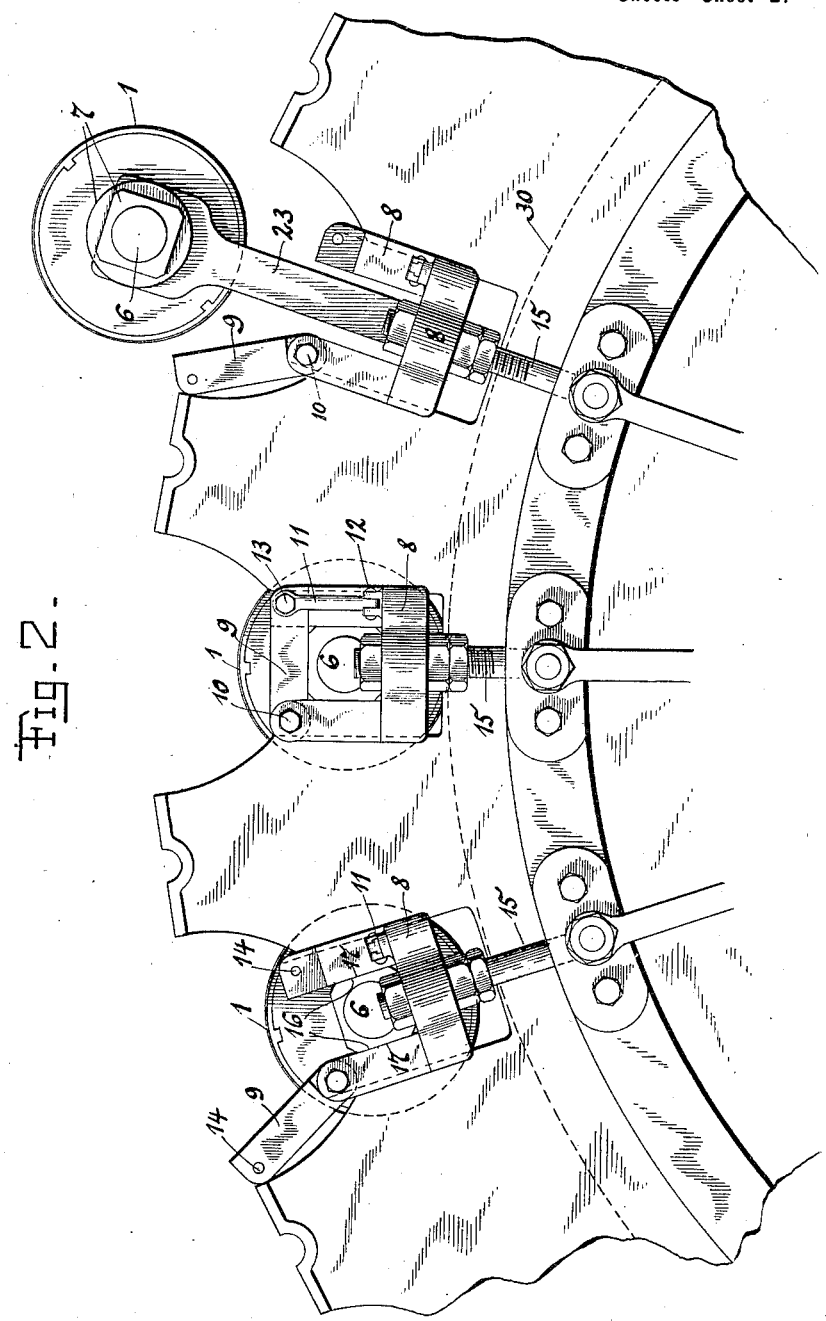
WITNESSES:
INVENTOR
Edward Hett
BY
ATTORNEYS

UNITED STATES PATENT OFFICE.

EDWARD HETT, OF NEW YORK, N. Y.

PRESS.

SPECIFICATION forming part of Letters Patent No. 662,870, dated November 27, 1900.

Application filed November 20, 1899. Serial No. 737,657. (No model.)

*To all whom it may concern:*

Be it known that I, EDWARD HETT, a citizen of the United States, and a resident of New York, (New Dorp,) county of Richmond, and State of New York, have invented certain new and useful Improvements in Presses, of which the following is a specification.

My invention relates to presses, and particularly to printing-forms and to supports therefor for use in presses. Its objects are to provide new and improved printing-forms and new and improved journals and bearings and supports for printing-forms; also, to enable printing-forms to be readily removed from position in a press and to be readily placed in position therein; also, to enable printing-forms to be readily placed in position in the press in exact and predetermined relationship with the coöperating parts of the press; also, to provide new and improved means to enable printing-forms to be readily secured or locked in position in the press; also, to improve the length of life of the journals of printing-forms, and also to improve and cheapen the construction of printing-forms and to make them of less weight without impairing their strength or durability.

It consists of the novel devices herein shown and described.

In the drawings accompanying this specification and forming part hereof, and in which similar reference characters in the different figures represent corresponding parts, I have shown and will now proceed to describe the preferred embodiment of my improvement.

Referring now to the drawings, Figure 1 is a view of a printing-form embodying my improvement in its preferred form. The printing-form is shown partly in elevation and partly in section and is shown mounted in a press, only such surrounding parts of the press being shown as are necessary for a clear understanding of my invention, the parts of the press being shown in section. Fig. 2 is a side view of a part of a multicolor-press to which my improved devices have been applied.

Referring to the form of my improved device shown in the drawings, 1 is a printing-form embodying my invention in its preferred form. In the form shown this printing-form is made hollow with a base 2, preferably made of aluminium to secure lightness with the proper degree of strength and having a cylindrical tube or shell 3, of copper, driven thereon, so as to be a permanent part of the printing-form. The printing-form, as shown, has an exterior coating 4, made of zinc, electrolytically deposited upon the copper tube. This zinc coating is adapted to be made into a printing-surface of any desired character. The shell of copper is driven snugly up to and against collar 5 at one end of the printing-form, so as to bring this coating and the printing-surface deposited thereon into accurate predetermined position upon the printing-form. Preferably the base and the coatings upon it are made of predetermined size and shape and thickness, so that the printing-form will be of predetermined shape and dimensions to permit it to be used interchangeably with other and similar printing-forms of the same predetermined shape and dimensions either successively in the same position in the same press or in different positions or simultaneously with such other similar printing-forms in a multicolor-printing press. The zinc coating is preferably removable and renewable without substantially affecting the size of the form.

The journals of the printing-form may be made in any suitable way. Preferably they consist of two short journal-shafts 6, preferably of hardened steel, and removably secured to the printing-form, but adapted, when secured to it, to form a permanent and integral part of the form and removable with it from the press and replaceable with it therein. As shown, the inner ends of these journal-shafts are screw-threaded and screw into interior screw-threads in the ends of the printing-form. When thus screwed in, they form a permanent part of the printing-form, the two short journal-shafts constituting the journal of the printing-form. By this construction the part of the form which fits into the bearing may be made of hardened steel, and thus be made durable, while the other parts of the printing-form may be made of any suitable material, preferably, as shown, of aluminium. By making these journals removably secured to the printing-form I am enabled to remove and renew them when worn.

The bearings for the journals of the printing-form I preferably make removable, with their journals, from their supporting-boxes, so that the printing-form and its journals and bearings can be removed from the supporting-boxes and be replaced therein or in similar supporting-boxes in the same or in other presses to make the journals and their bearings always accurately fit each other and to aid the seating of the printing-form in the press in accurate predetermined position without adjustment. As shown, the removable bearing consists of a bushing 7, which fits into a supporting-box 8.

The supporting-boxes 8 are preferably made with a cover 9 removable from the path of a journal and its bearing as the latter are inserted into or removed from the box. This cover is removably hinged, as at 10. When the cover is swung up, as shown in two of the cases in Fig. 2, it permits the removal or insertion of the journal and bearing. When in its closed position, as also shown in Fig. 2, it is preferably latched or held downward by latch 11 for firmly holding the journal and bearing in the box. Latch 11 is pivoted at 12 and locks cover 9 by means of a bolt and screw-head 13, passing through openings 14 14 in the cover and the box. 15 represents the usual pressure-rods for removing the boxes, and with them the printing-form, into and out of printing position in the press. These pressure-rods are of any usual construction and may be moved in any usual way. The details of this part of the mechanism will not be further described. Cover 9 when securely locked in position firmly holds the printing-form in the boxes and permits the pressure-rods to properly regulate the pressure.

The bearings are preferably made with parallel sides 16 16 to fit into a corresponding seat of the supporting-box having similar parallel sides 17 17. In this way a snug fit is secured between the bearing and its supporting-box. This assists in regulating the pressure and in bringing the printing-form into accurate predetermined relation with cooperating parts of the press.

As shown in Fig. 1, 18 is the impression-surface. 19 represents the paper on which the printing is being effected. 20 20 are grippers for holding the paper, and 21 represents the mechanism for operating the grippers. Any suitable grippers and any suitable mechanism for operating the grippers may be used, so that the details will not be further described.

22 23 represent part of the mechanism for raising the printing-form out of its working position in the press for removal from the press or insertion therein. As this mechanism forms no part of the present invention, it will not be further described.

24 is a gear-wheel mounted upon the printing-form for rotating the same. It may be driven in any suitable way, as by gear 25, which is represented as being connected to and revolving with the impression-drum upon which printing-surface 18 is mounted.

26 is a marked tooth upon gear-wheel 24. It is marked so as to enable the operative to place the printing-form, with this tooth and with gear 25, in exact predetermined position, so that when the printing-form is used in a multicolor-press, for example, with other printing-forms, accurate predetermined relationship with the coöperating parts of the press for the purpose of register may be obtained transversely or circumferentially where an impression-drum is employed. Marked tooth 26 constitutes a guiding means for this purpose. Journals 6 and bearings 7 and boxes 8 are arranged so that the journals and bearings will always fit in exactly the same position in the supporting-boxes in order to bring the printing-form into accurate and predetermined position longitudinally. As shown, this is obtained by means of the rib 27 on the bearing, by shoulder 28 upon the printing-form, and shoulder 29 on the supporting-box bearing against one another, as clearly shown in Fig. 1.

In Fig. 2 I have shown a part of a multicolor-press, showing a series of printing-forms mounted therein. As there shown, two printing-forms are mounted in working position, one of the two being securely locked in its supporting-boxes, and the other printing-form is shown as moved outward from its supporting-boxes, with its journals and bearings ready to be removed from the press. In this figure, 30 represents the impression-surface of an impression-drum.

It is not essential to my invention in some of its aspects that the printing-form be made hollow or of the material or materials herein shown or that it be provided with any coating. Any suitable form or shape of printing-form may be employed, and the printing-form may be made of any suitable material. For some purposes I prefer to omit the copper shell and zinc coating, making the printing-form of aluminium alone and transforming its surface by any suitable means into a printing-surface. Nor is it essential to my invention that the journals be removable from the printing-form. Many modifications in these and other respects may be made in the form of the devices shown in the drawings herein, and many parts of the same may be omitted and other parts substituted without departing from my invention, the essentials of which are set forth in the claims herein.

My improved devices are especially serviceable in connection with lithographic presses, and particularly with multicolor lithographic presses.

What I claim as new, and desire to secure by Letters Patent, is—

1. The combination of a printing-form, journals therefor, bearings for the journals, the journals and bearings being removable from their supporting-boxes, and supporting-boxes each adapted to receive and support a bearing, whereby the printing-form with its journals and bearings may be removed from their boxes and be replaced therein or in similar supporting-boxes.

2. The combination of a printing-form, journals therefor, bearings for the journals, the journals and bearings being removable from their supporting-boxes, and supporting-boxes each adapted to receive and support a bearing, a cover for each box removable from the path of the journal and bearing, as they are inserted into or removed from the box, to permit such insertion or removal, means for locking the cover in position, and means for moving the boxes toward or away from the impression-surface to regulate the pressure, whereby the printing-form with its journals and bearings may be removed from their boxes and be replaced therein or in similar supporting-boxes and be firmly held in the boxes.

3. The combination of a printing-form, journals therefor, bearings for the journals, the journals and bearings being removable from their supporting-boxes, supporting-boxes each adapted to receive and support a bearing, a hinged cover for each box adapted to swing out of the path of the journal and bearing, as they are inserted into or removed from the box, to permit such insertion or removal, means for locking the cover in its closed position, and means for moving the boxes toward or away from the impression-surface to regulate the pressure, whereby the printing-form with its journals and bearings may be removed from their boxes and be replaced therein or in similar supporting-boxes and be firmly held in the boxes.

4. The combination of a printing-form, journals therefor, bearings for the journals, having parallel sides, the journals and bearings being removable from their supporting-boxes, supporting-boxes each having a seat with parallel walls into which a bearing is adapted to snugly fit, a cover for each box removable from the path of its journal and bearing, as they are inserted into or removed from the box, to permit such insertion or removal, means for locking the cover in position, and means for moving the boxes toward or away from the impression-surface to regulate the pressure, whereby the printing-form with its journals and bearings may be removed from their boxes and be replaced therein or in similar supporting-boxes and be firmly held in the boxes.

5. The combination of a printing-form, journals therefor, bearings for the journals, having parallel sides, the journals and bearings being removable from their supporting-boxes, supporting-boxes each having a seat with parallel walls into which a bearing is adapted to snugly fit, a hinged cover for each box adapted to swing out of the path of its journal and bearing, as they are inserted into or removed from the box, to permit such insertion or removal, means for locking the cover into position, and means for moving the boxes toward or away from the impression-surface to regulate the pressure, whereby the printing-form with its shaft and bearings may be removed from their boxes and be replaced therein or in similar supporting-boxes and be firmly held in the boxes.

6. The combination of a printing-form, a journal at each end of the printing-form removably secured thereto but adapted, when secured, to form an integral part of the printing-form, bearings for the journals, each journal and its bearing being removable from its supporting-box, and supporting-boxes adapted to receive and support the bearings, whereby the printing-form with its journals and bearings may be removed from their boxes and be replaced therein or in similar supporting-boxes.

7. The combination of a printing-form, a journal at each end of the printing-form removably secured thereto but adapted, when secured, to form an integral part of the printing-form, bearings for the journals, each journal and its bearings being removable from its supporting-box, supporting-boxes adapted to receive and support the bearings, a cover for each box removable from the path of its journal and bearing, as they are inserted into or removed from the box, to permit such insertion or removal, and means for locking the cover in position, whereby the printing-form with its journals and bearings may be removed from their boxes and be replaced therein or in similar supporting-boxes and be firmly held in the boxes.

8. The combination of a printing-form, a journal of hardened steel at each end of the printing-form removably secured thereto but adapted, when secured, to form an integral part of the printing-form, bearings for the journals, each journal and its bearing being removable from its supporting-box, supporting-boxes adapted to receive and support the bearings, whereby the printing-form with its journals and bearings may be removed from their boxes and be replaced therein or in similar supporting-boxes.

9. The combination of a printing-form, a journal of hardened steel at each end of the printing-form removably secured thereto but adapted, when secured, to form an integral part of the printing-form, bearings for the journals, each journal and its bearing being removable from its supporting-box, supporting-boxes adapted to receive and support the bearings, a cover for each box removable from the path of its journal and bearing, as they are inserted into or removed from the box, to permit such insertion or removal, means for locking the cover in position, whereby the printing-form with its journals and bearings may be removed from their boxes and be replaced therein or in similar supporting-boxes and be firmly held in the boxes.

10. The combination of a printing-form, a journal at each end of the printing-form removably secured thereto but adapted, when secured, to form an integral part of the printing-form, bearings for the journals, having parallel sides, each journal and its bearing being removable from its supporting-box, supporting-boxes having seats with parallel walls into which the bearings are adapted to snugly fit, a hinged cover for each box adapted to swing out of the path of its journal and bearing, as they are inserted into or removed from the box, to permit such insertion or removal, and means for locking the cover in its closed position, whereby the printing-form with its journals and bearings may be removed from their boxes and be replaced therein or in similar supporting-boxes.

11. In a multicolor-press the combination of an impression-drum, a plurality of printing-forms arranged concentrically around the same, journals for the printing-forms, bearings for the journals, each journal and its bearing being removable from their supporting-boxes, and supporting-boxes for the bearings, each supporting-box adapted to receive and support a bearing, and means for moving the boxes toward or away from the impression-drum to regulate the pressure, whereby printing-forms with their journals and bearings may be removed from their supporting-boxes and be replaced therein or in similar supporting-boxes in the press.

12. In a multicolor-press the combination of an impression-drum, a plurality of printing-forms arranged concentrically around the same, journals for the printing-forms, bearings for the journals, each journal and its bearing being removable from their supporting-boxes, and supporting-boxes for the bearings, each supporting-box being adapted to receive and support a bearing, a cover for each box removable from the path of the journal and bearing, as they are inserted into or removed from the box, to permit such insertion or removal, and means for locking the cover in position, means for moving the boxes toward or away from the impression-drum to regulate the pressure, whereby printing-forms with their journals and bearings may be removed from their supporting-boxes and be replaced therein or in similar supporting-boxes in the press and be firmly held in the boxes.

13. In a multicolor-press the combination of an impression-drum, a plurality of printing-forms arranged concentrically around the same, journals for the printing-forms, bearings for the journals, each journal and its bearing being removable from their supporting-boxes, and supporting-boxes each having a seat with parallel walls into which a bearing is adapted to snugly fit, a cover for each box removable from the path of its journal and bearing, as they are inserted into or removed from the box, to permit such insertion or removal, means for locking the cover in position, and means for moving the boxes toward or away from the impression-drum to regulate the pressure, whereby printing-forms with their journals and bearings may be removed from their supporting-boxes and be replaced therein or in similar supporting-boxes in the press and be firmly held in the boxes.

14. In a multicolor-press the combination of an impression-drum, a plurality of printing-forms arranged concentrically around the same, a journal at each end of each printing-form removably secured thereto but adapted, when secured, to form an integral part of the printing-form, bearings for the journals, each journal and its bearing being removable from its supporting-boxes, supporting-boxes adapted to receive and support the bearings, and means for moving the boxes toward or away from the impression-drum to regulate the pressure, whereby the printing-forms with their journals and bearings may be removed from their supporting-boxes and be replaced therein or in similar supporting-boxes in the press and be firmly held in the boxes.

15. In a multicolor-press the combination of an impression-drum, a plurality of printing forms arranged concentrically around the same, a journal at each end of each printing-form removably secured thereto but adapted, when secured, to form an integral part of the printing-form, bearings for the journals, each journal and its bearing being removable from its supporting-box, supporting-boxes adapted to receive and support the bearings, a cover for each box removable from the path of its journal and bearing, as they are inserted into or removed from the box to permit such insertion or removal, means for locking the covers in position, and means for moving the boxes toward or away from the impression-drum to regulate the pressure, whereby printing-forms with their journals and bearings may be removed from their supporting-boxes and be replaced therein or in similar supporting-boxes in the press and be firmly held in the boxes.

16. In a multicolor-press the combination of an impression-drum, a plurality of printing-forms arranged concentrically around the same, journals of hardened steel at the ends of the printing-forms removably secured thereto but adapted, when secured, to form an integral part of the printing-forms, bearings for the journals, each journal and its bearing being removable from their supporting-boxes, supporting-boxes for the bearings, each supporting-box being adapted to receive and support a bearing, and means for moving the boxes toward or away from the impression-drum to regulate the pressure, whereby printing-forms with their journals and bearings may be removed from their supporting-boxes and be replaced therein or in similar supporting-boxes in the press and be firmly held in the boxes.

17. In a multicolor-press the combination of an impression-drum, a plurality of printing-forms arranged concentrically around the same, journals of hardened steel at the ends of the printing-forms removably secured thereto but adapted, when secured, to form an integral part of the printing-forms, bearings for the journals, each journal and its bearing being removable from its supporting-box, supporting-boxes adapted to receive and support the bearings, a cover for each box removable from the path of its journal and bearing, as they are inserted into or removed from the box, to permit such insertion or removal, means for locking the cover in position, and means for moving the boxes toward or away from the impression-drum to regulate the pressure, whereby printing-forms with their journals and bearings may be removed from their supporting-boxes and be replaced therein or in similar supporting-boxes in the press and be firmly held in the boxes.

18. In a multicolor-press the combination of an impression-drum, a plurality of printing-forms arranged concentrically around the same, a journal at each end of each printing-form removably secured thereto but adapted, when secured, to form an integral part of the printing-form, bearings for the journals, having parallel sides, each journal and its bearing being removable from its supporting-box, supporting-boxes having seats with parallel walls into which the bearings are adapted to snugly fit, a hinged cover for each box adapted to swing out of the path of its journal and bearing, as they are inserted into or removed from the box, to permit such insertion or removal, means for locking the cover in its closed position, and means for moving the boxes toward or away from the impression-drum to regulate the pressure, whereby printing-forms with their journals and bearings may be removed from their supporting-boxes and be replaced therein or in similar supporting-boxes in the press and be firmly held in the boxes.

19. In a multicolor-press the combination of an impression-drum, a plurality of printing-forms arranged concentrically around the same, journals for the printing-forms, bearings for the journals, each journal and its bearing being removable from their supporting-boxes, supporting-boxes for the bearings, each supporting-box being adapted to receive and support a bearing, preëstablished guides with reference to which the printing-form may be seated in the press and with reference to which it may be brought into accurate predetermined relation with the coöperating parts of the press for the purpose of register, and means for moving the boxes toward or away from the impression-drum to regulate the pressure, whereby printing-forms with their journals and bearings may be removed from their supporting-boxes and be replaced therein or in similar supporting-boxes in the press and be firmly held in the boxes.

In testimony whereof I have signed my name to this specification in the presence of two subscribing witnesses.

EDWARD HETT.

Witnesses:
 EDWIN SEGER,
 GEO. W. MILLS, Jr.